US007344289B2

(12) United States Patent
Fallahi et al.

(10) Patent No.: US 7,344,289 B2
(45) Date of Patent: Mar. 18, 2008

(54) HEADLAMP ASSEMBLY WITH INTEGRATED REFLECTOR AND HEAT SINK

(75) Inventors: Amir P. Fallahi, W. Bloomfield, MI (US); Thomas Lee Jones, Commerce Township, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 34 days.

(21) Appl. No.: 11/295,997

(22) Filed: Dec. 7, 2005

(65) Prior Publication Data

US 2007/0127252 A1 Jun. 7, 2007

(51) Int. Cl.
*B60Q 1/00* (2006.01)

(52) U.S. Cl. ...................................... 362/547; 362/294

(58) Field of Classification Search ................ 362/475, 362/507, 514, 538, 544–545, 546–547
See application file for complete search history.

(56) References Cited

U.S. PATENT DOCUMENTS 1,681,153 A 8/1928 Johnston
3,309,565 A 3/1967 Clark et al.
3,539,799 A * 11/1970 Dangauthier ................ 362/328
3,639,751 A 2/1972 Pichel
4,085,248 A * 4/1978 Zehender et al. ........... 428/336
4,168,522 A 9/1979 Van de Laarschot et al.
4,598,347 A 7/1986 Peppers
4,724,515 A 2/1988 Matsuki et al.
4,729,076 A 3/1988 Masami et al.
4,760,509 A * 7/1988 Panagiotou ................. 362/285
4,780,799 A 10/1988 Groh
4,931,912 A 6/1990 Kawakami et al.
4,937,710 A 6/1990 Hurley et al.
4,978,890 A 12/1990 Sekiguchi et al.
5,172,973 A 12/1992 Spada
5,406,467 A 4/1995 Hashemi
5,458,505 A 10/1995 Prager
5,758,955 A 6/1998 Belliveau
5,857,767 A * 1/1999 Hochstein .................. 362/294
5,947,592 A 9/1999 Barlow (Continued)

FOREIGN PATENT DOCUMENTS

FR 2 701 756 2/1993

(Continued)

OTHER PUBLICATIONS

English Abstract of French Publication No. FR 2 698 055 A1, no date.

(Continued)

*Primary Examiner*—Jong-Suk (James) Lee
*Assistant Examiner*—Julie A. Shallenberger
(74) *Attorney, Agent, or Firm*—Brinks Hofer Gilson & Lione

(57) ABSTRACT

A headlamp assembly for a motor vehicle. The headlamp assembly includes a lens and a housing cooperating to at least partially define an inner chamber that is generally fluidly isolated from the atmosphere. Mounted within the inner chamber is a one piece reflector having a reflective portion and a heat sink portion. The reflective portion reflects light from a light source forward through the lens, while the heat sink portion conducts heat from the reflective portion and dissipates the heat from the assembly.

12 Claims, 2 Drawing Sheets

U.S. PATENT DOCUMENTS

| | | | | |
|---|---|---|---|---|
| 6,021,954 | A | 2/2000 | Kalwa et al. | |
| 6,045,248 | A | 4/2000 | Ashizawa | |
| 6,071,000 | A | 6/2000 | Rapp | |
| 6,183,114 | B1 | 2/2001 | Cook et al. | |
| 6,210,024 | B1 | 4/2001 | Shida | |
| 6,224,247 | B1 | 5/2001 | Ashizawa | |
| 6,367,949 | B1 * | 4/2002 | Pederson | 362/240 |
| 6,402,346 | B1 | 6/2002 | Liano et al. | |
| 6,419,382 | B1 | 7/2002 | Nakagawa et al. | |
| 6,497,507 | B1 | 12/2002 | Weber | |
| 6,558,026 | B2 | 5/2003 | Strazzanti | |
| 6,595,672 | B2 | 7/2003 | Yamaguchi | |
| 6,634,771 | B2 | 10/2003 | Cao | |
| 6,648,495 | B1 | 11/2003 | Hsu | |
| 6,676,283 | B2 | 1/2004 | Ozawa et al. | |
| 6,682,211 | B2 * | 1/2004 | English et al. | 362/545 |
| 6,773,154 | B2 | 8/2004 | Desai | |
| 6,860,620 | B2 * | 3/2005 | Kuan et al. | 362/294 |
| 6,864,513 | B2 | 3/2005 | Lin et al. | |
| 6,910,794 | B2 | 6/2005 | Rice | |
| 2002/0141188 | A1 | 10/2002 | Basey | |
| 2002/0154514 | A1 | 10/2002 | Yagi et al. | |
| 2002/0167818 | A1 | 11/2002 | Yoneima | |
| 2003/0002179 | A1 | 1/2003 | Roberts et al. | |
| 2003/0043590 | A1 * | 3/2003 | Walser et al. | 362/494 |
| 2003/0218885 | A1 | 11/2003 | Ishizaki | |
| 2004/0012975 | A1 | 1/2004 | Chase et al. | |
| 2004/0085768 | A1 | 5/2004 | Kai et al. | |
| 2004/0120156 | A1 | 6/2004 | Ryan | |
| 2004/0145909 | A1 | 7/2004 | Ognian et al. | |
| 2004/0149054 | A1 | 8/2004 | Soga et al. | |
| 2004/0202007 | A1 * | 10/2004 | Yagi et al. | 362/545 |
| 2004/0213016 | A1 | 10/2004 | Rice | |
| 2005/0024864 | A1 | 2/2005 | Galli | |
| 2005/0094414 | A1 * | 5/2005 | Ishida et al. | 362/545 |

FOREIGN PATENT DOCUMENTS

| | | |
|---|---|---|
| FR | 2 698 055 A | 5/1994 |
| JP | 5 235224 | 9/1993 |

OTHER PUBLICATIONS

English Abstract of French Publication No. FR 2 701 756, no date.
English Abstract of Japanese Publication No. JP 5 235224, no date.

* cited by examiner

HEADLAMP ASSEMBLY WITH INTEGRATED REFLECTOR AND HEAT SINK

BACKGROUND

1. Field of the Invention

The invention relates generally to a headlamp assembly for a motor vehicle. More specifically, the invention relates to the cooling of a headlamp assembly by conducting heat from the light source to the exterior of the headlamp assembly via conductive heat sinks.

2. Related Technology

Headlamp assemblies have a light source, such as an incandescent lamp, a light emitting diode (LED) or high intensity discharge (HID) lamp, positioned within a headlamp chamber and electrically connected to a power source. The headlamp chamber is typically defined by a transparent or translucent lens, located forward of the light source, and a reflector located rearward and/or surrounding the light source. As used herein, the terms forward and rearward are referenced with respect to the position of the light source and the direction of the area that the light from the source is intended to illuminate. Thus, light from the assembly is intended to illuminate an area forward of the assembly.

During an operation cycle of the headlamp assembly, the light sources and other components of the lamp generate heat while "on" and cool while "off", causing the chamber to undergoes temperature fluctuation and causing the air located within to expand and contract. To maintain a relative-constant chamber pressure, the chamber typically includes at least one opening that permits an air exchange between the chamber and the ambient air. However, to prevent contaminants, such as dust and debris, from entering the chamber, the opening is relatively small and is typically covered with an air-permeable membrane.

In order to attain the optimal performance of newer light sources, such as LED'S and their electrical components in the lamp assembly, it is desirable to maintain the internal temperature of the lamp assembly below the maximum operating temperature of these sources and components. Therefore, it is advantageous to provide the headlamp assembly with a mechanism that cools the chamber and the LED'S located therein.

Headlamp assemblies are also typically located on the vehicle in a position that is adjacent to the engine compartment. The temperature within the engine compartment is often significantly higher than the temperature outside of the engine compartment (the ambient temperature). For example, during operation of the vehicle, various components, such as the engine and the engine cooling system, output heat into the engine compartment. As another example, during periods of vehicle use and non-use, the air trapped within the engine compartment may become heated by solar energy. Therefore, it is advantageous to provide the headlamp assembly with a mechanism that isolates the chamber, and the light sources located therein, from the relatively high temperatures of the engine compartment.

In view of the above, it is beneficial to have a headlamp assembly that has a mechanism that effectively cools the assembly's internal components while minimizing air exchange between the inner chamber and the atmosphere and while isolating the inner chamber from the engine compartment and the relatively high temperatures associated therewith.

SUMMARY

In overcoming the above limitations and other drawbacks, a headlamp assembly for a motor vehicle is provided that includes a lens and a housing, cooperating to at least partially define an inner chamber that is generally fluidly isolated from the atmosphere. A base is mounted within the inner chamber and a light source is mounted onto the base, as is a reflector. The reflector includes portions that are adapted to reflect light from the light source forward through the lens and portions that define a heat sink.

In one aspect, the reflector is a one piece component made from an alloy selected from the group including magnesium alloys, aluminum alloys, and zinc alloys, and is formed by casting. Among others, such alloys include magnesium alloys, aluminum alloys, and zinc alloys.

In another aspect, the reflector is a one piece component made from a thixotropic alloy. Among others, such alloys include magnesium alloys, aluminum alloys.

In a further aspect, the reflector is formed by semi-solid metal injection molding.

In yet another aspect, the portions of the reflector that are adapted to reflect light from the light source are polished to a reflective finish.

In still another aspect, the portions of the reflector that reflect light from the light source are evaporation coated with a reflective aluminum coating.

Further objects, features and advantages of this invention will become readily apparent to persons skilled in the art after a review of the following description, with reference to the drawings and claims that are appended to and form a part of this specification.

DETAILED DESCRIPTION

Figure 1:
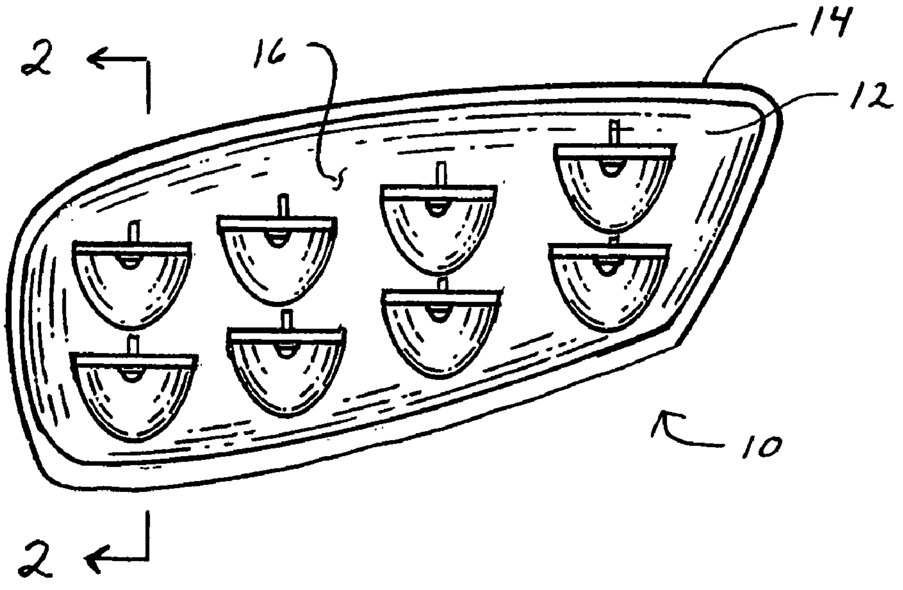
FIG. 1 is a front view of a headlamp assembly, in a motor vehicle, having features described in the claims.
Figure 2:
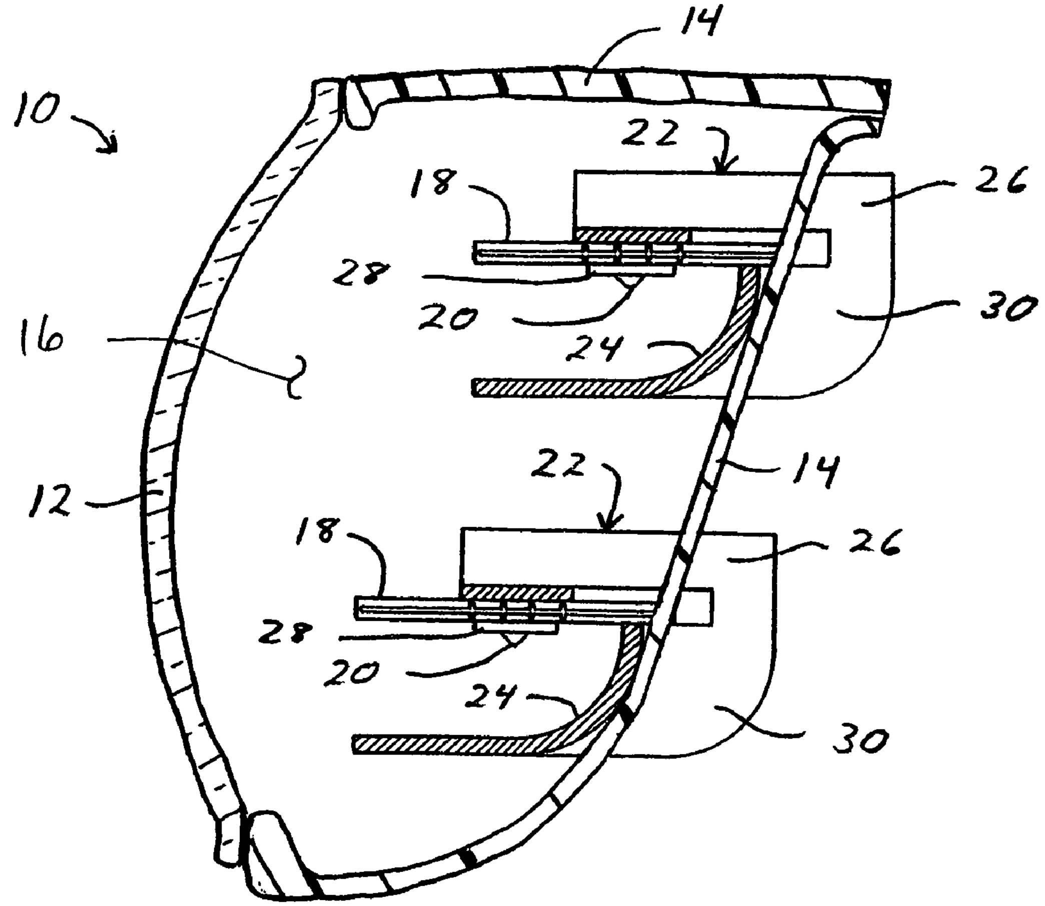
FIG. 2 is a side sectional view, generally taken along line 2-2, of the headlamp assembly shown in FIG. 1.

Referring to FIGS. 1 and 2, a headlamp assembly for a motor vehicle embodying the principles of the present invention is shown therein and generally designated at 10. The headlamp assembly 10 includes a lens 12 and a housing 14 that cooperate to at least partially define an inner chamber 16, which is generally fluidly isolated from the atmosphere. The housing 14 is preferably opaque, and the lens 12 is preferably formed from a transparent or translucent plastic material, such as glass or plastic, including polycarbonate.

Figure 3:
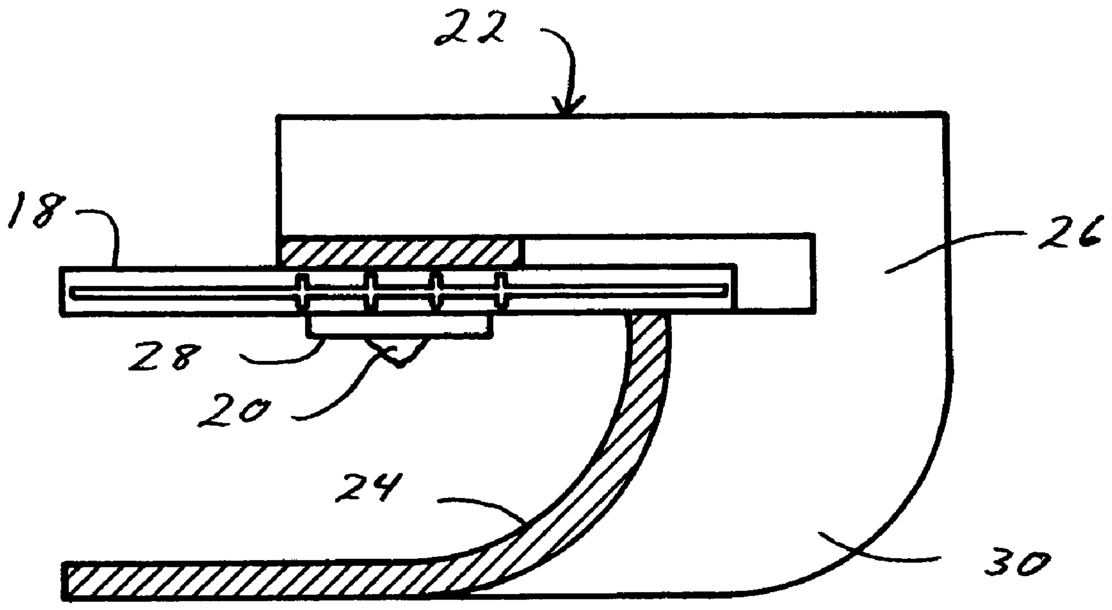
FIG. 3 is a side sectional view of one of the heat sinks shown in FIGS. 1 and 2.

A series of bases 18 are mounted within the inner chamber 16 to an inner surface 19 of the housing 14. Referring to FIGS. 2 and 3, a light source 20 is conventionally mounted onto the bases 18 within the inner chamber 16. An integrated reflector 22 is also mounted onto the bases 18 and includes portions that define a reflecting portion 23, having a reflective surface 24, and portions that define a heat sink 26 in contract with the bases 18. The reflective surface 24 is adapted to reflect light from the light source 20 forward through the lens 12 and focuses the light rays from the light source 20 into a beam having the desired characteristics and directs the light rays through the lens 12 and forward of the assembly 10. As will be apparent, the heat sink 26 is adapted to conduct heat away from the light source 20.

Preferably, the reflector 22 is a single piece component made from metal or a metal alloy, such as magnesium alloys, aluminum alloys, and zinc alloys. The reflector 22 can be made by casting or other suitable processes to create a single piece component. One preferred method for making the reflector 22 is semi-solid metal injection molding (SSMIM). The SSMIM process is particularly advantageous for this application because the process produces near net shaped parts, thereby reducing the amount of finishing and improving the quality of the parts. SSMIM yields parts having dimensional stability, low porosity, tight tolerances with reduced shrinkage, residual stress, and component distortion, thereby making SSMIM ideal for producing parts having extremely thin wall thicknesses.

The reflective surface 24 can be polished to a reflective finish or may have a reflective coating applied to it by a process such as evaporation coating. In such an instance, the reflective coating can be an aluminum coating or any other suitable reflective coating.

The housing 14 and the lens 12 are connected with one another such that the inner chamber 16 is substantially sealed from the atmosphere. The inner chamber 16 is, however, provided with pressure vents (not shown) that permit a relatively small amount of airflow into and out of the inner chamber 16 to account for air pressure fluctuations during temperature changes within the chamber 16.

The light source 20, is preferably a light emitting diode (LED). The light source 20, hereinafter just “LED 20”, is attached to a printed circuit board (PCB) 28 that includes electronic controls and connections for the LED 20. The LED 20 and the PCB 28 are mounted together on the base 18 within the inner chamber 16. Preferably, the LED 20 and the PCB 28 are mounted onto the base 18 with a thermal conductive adhesive.

As shown in FIGS. 1 and 2, a series of bases 18 (eight being illustrated for exemplary purposes only) having LEDs 20 mounted thereon are positioned within the inner chamber 16 of the headlamp assembly 10. As will be appreciated, the number of LEDs 20 and the arrangement of the LEDs 20 will depend upon the requirements of the particular application within which they are ultimately employed.

Referring to FIG. 2, the heat sink 26 portions of the reflector 22 include heat sink fins 30 that extend through the housing and are exposed to ambient air, outside the inner chamber 16 will be further discussed below, the heat sink fins 30 conduct heat from the inner chamber.

During operation of the headlamp assembly 10, the LEDs 20 generate heat causing an increase in the temperature of the air, components and structures located within the inner chamber 16. The LEDs 20 and/or other electronic components, however, may experience diminished performance or failure if their maximum operating temperatures are exceeded. To reduce the temperature of these components and the chamber 16, the LEDs 20 are mounted onto the bases 18, and bases are mounted to the reflectors 22. As such, heat from the LEDs 20 is conducted through the bases 18, to the reflector 22, and specifically to the portions of the reflector 22 that define heat sink fins 30 located outside of the inner chamber 16. Ambient air flowing across the heat sink fins 30 cools the heat sink fins 30, thereby dissipating the heat conducted from within the inner chamber 16.

It is therefore intended that the foregoing detailed description be regarded as illustrative rather than limiting, and that it be understood that it is the following claims, including all equivalents, that are intended to define the spirit and scope of this invention.

What is claimed is:

1. A headlamp assembly for a motor vehicle comprising:

a lens;

a housing, the housing and the lens cooperating to at least partially define an inner chamber that is generally fluidly isolated from the atmosphere;

a non-planar reflector mounted to the housing, the reflector being of unitary construction and having a reflective portion and a heat sink portion, the reflector portion adapted to reflect light from the light source forward through the lens, the heat sink portion extending through the housing and being exposed to ambient conditions outside thereof such that heat from the inner chamber is transmitted to the ambient conditions;

a base mounted to the reflector within the inner chamber; and a light source mounted onto the base.

2. A headlamp assembly as in claim 1, wherein the reflector is a one piece casting.

3. A headlamp assembly as in claim 1, wherein the reflector is made of metal.

4. A headlamp assembly as in claim 1, wherein the reflector is made from an alloy selected from the group: magnesium alloys, aluminum alloys, and zinc alloys.

5. A headlamp assembly as in claim 1, wherein the reflective portions of the reflector include polished surfaces to define a reflective finish.

6. A headlamp assembly as in claim 1, wherein the reflective portions of the reflector include a reflective coating.

7. A headlamp assembly as in claim 6, wherein the reflective coating is an evaporative coating.

8. A headlamp assembly as in claim 7, wherein the reflective coating is an aluminum coating.

9. A headlamp assembly as in claim 1, wherein the light source is coupled to the base with a conductive thermal adhesive.

10. A headlamp assembly as in claim 1, wherein the light source is a light emitting diode.

11. A headlamp assembly as in claim 10, wherein the light source is mounted to a printed circuit board and the printed circuit board is mounted to the base.

12. A headlamp assembly for a motor vehicle comprising:

a lens and housing cooperating to at least partially define an inner chamber that is generally fluidly isolated from atmospheric conditions;

a one piece, non-planar, metal reflector, the reflector having a reflective portions adapted to reflect light from a light source forward through the lens, the reflector also having fin portions defining a heat sink, wherein the fin portions extend through the housing to a location outside the chamber;

a base mounted within the inner chamber; and the light source being mounted to the reflector onto the base, the light source being a light emitting diode whereby heat generated by the light emitting diode is conducted from the reflective portion to the fin portions and disposed by the fin portions.

* * * * *